(12) United States Patent
Batten et al.

(10) Patent No.: US 9,700,815 B2
(45) Date of Patent: *Jul. 11, 2017

(54) ECONOMICAL WASTE REMOVAL SYSTEM FOR FAT, OIL, AND GREASE

(71) Applicant: Thermaco, Inc., Asheboro, NC (US)

(72) Inventors: William C. Batten, Asheboro, NC (US); Bruce W. Kyles, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 467 days.

This patent is subject to a terminal disclaimer.

(21) Appl. No.: 14/088,899

(22) Filed: Nov. 25, 2013

(65) Prior Publication Data

US 2014/0150877 A1 Jun. 5, 2014

Related U.S. Application Data

(60) Provisional application No. 61/729,681, filed on Nov. 26, 2012.

(51) Int. Cl.
*B01D 21/24* (2006.01)
*B01D 17/02* (2006.01)
*E03F 5/16* (2006.01)

(52) U.S. Cl.
CPC ............ *B01D 17/0211* (2013.01); *E03F 5/16* (2013.01); *Y10T 29/494* (2015.01); *Y10T 137/0318* (2015.04); *Y10T 137/86276* (2015.04)

(58) Field of Classification Search
None
See application file for complete search history.

(56) References Cited

U.S. PATENT DOCUMENTS

| | | | | |
|---|---|---|---|---|
| 4,399,020 | A | * 8/1983 | Branchick | ............ C02F 1/4678 204/269 |
| 4,472,277 | A | 9/1984 | Bailey et al. | ................. 210/238 |
| 5,799,645 | A | * 9/1998 | Strader | ............... A47J 37/0786 126/39 R |
| 5,908,551 | A | * 6/1999 | Onken | ................ A47J 37/1271 141/82 |
| 5,971,163 | A | 10/1999 | Gurfinkel | ...................... 210/514 |

(Continued)

FOREIGN PATENT DOCUMENTS

| | | |
|---|---|---|
| GB | 2374352 | 10/2002 |
| JP | 2002-059156 | 2/2002 |

(Continued)

OTHER PUBLICATIONS

PCT/US13/71693; Written Opinion.

*Primary Examiner* — Richard Gurtowski
(74) *Attorney, Agent, or Firm* — MacCord Mason PLLC

(57) ABSTRACT

An economical fat, oil and grease removal assembly and method includes a container having a bottom, a top, at least one sidewall, an inlet and an outlet. The outlet is spaced above the bottom and below the top to define a static water level for liquid in the container. The container may include at least one divider. The container further includes a valve at an elevation such that F.O.G. floating on water in the container can flow from the container out through the valve when a valve control is engaged and opened. The assembly further includes an inlet baffle, an outlet baffle and a removable storage tank arranged to accept F.O.G. that is flowed out of the container.

15 Claims, 8 Drawing Sheets

(56) References Cited

U.S. PATENT DOCUMENTS

| | | | | |
|---|---|---|---|---|
| 5,993,646 | A | 11/1999 | Powers | 210/86 |
| 6,318,598 | B1* | 11/2001 | Schmitt | B65D 1/20 |
| | | | | 222/143 |
| 6,800,195 | B1 | 10/2004 | Batten et al. | 210/138 |
| 6,849,176 | B1 | 2/2005 | Batten et al. | 210/97 |
| 6,951,615 | B2* | 10/2005 | Tripodi | B01D 17/005 |
| | | | | 210/187 |
| 7,153,439 | B1 | 12/2006 | Batten et al. | 210/800 |
| 7,186,346 | B1 | 3/2007 | Batten et al. | 320/776 |
| 7,208,080 | B2 | 4/2007 | Batten et al. | 210/86 |
| 7,431,852 | B2 | 10/2008 | Batten et al. | 210/801 |
| 7,481,321 | B2 | 1/2009 | Ismert | 210/519 |
| 8,273,255 | B2* | 9/2012 | Batten | B01D 17/0214 |
| | | | | 210/236 |
| 2001/0027954 | A1 | 10/2001 | Broeders et al. | 210/800 |
| 2007/0251879 | A1 | 11/2007 | Batten et al. | 210/532.1 |
| 2008/0061012 | A1 | 3/2008 | Hodgekins et al. | 210/803 |
| 2008/0179262 | A1 | 7/2008 | Batten et al. | 210/776 |
| 2010/0122954 | A1 | 5/2010 | Rodriguez-Jovet | 210/532.1 |
| 2011/0297626 | A1 | 12/2011 | Batten et al. | 20/800 |

FOREIGN PATENT DOCUMENTS

| | | |
|---|---|---|
| JP | 2009/262066 | 12/2009 |
| WO | 2011/079316 | 6/2011 |

* cited by examiner

ECONOMICAL WASTE REMOVAL SYSTEM FOR FAT, OIL, AND GREASE

BACKGROUND

The present invention relates generally to a low cost assembly and method for removal, storage and disposal of fats, oil, grease waste and, more particularly, to a system for separation of fat, oil, and/or grease from an effluent flow from a sink, permitting the passage of grey water to a sewage line.

Over the past thirty years there has been a move towards requiring food-handling facilities to have sufficient systems for servicing kitchen grease and solid waste bearing water flows. One of the largest problems, in terms of sewer system lines clogging, has been the fats, oils and grease put into the sewer system from food handling facilities. These problems and the increase in the severity of the situation in the recent past has led more and more sewer authorities to implement fats, oils, grease (hereinafter referred to as "F.O.G.") control programs. The object of many of these programs is to ensure that food handling facilities remove as much as possible of the F.O.G. from the effluent flow, thereby releasing only grey water and solids into the sewage system.

F.O.G. removal systems are generally well known. There has been a movement toward accomplishing removal in kitchen facilities through use of a container including one or more rotating disks formed of a plastic or like material to which oil and grease contaminants are attracted. Typically, the rotation of the disk, in at least partially immersed conditions, allows the oil to cling to the disk, so that the oil and grease is removed from the body of the water upon rotation of the disk. A scraper is typically used to force the oil and grease contaminants from the opposite sides of the disk and to channel such contaminants into an attached storage collection unit.

The above-mentioned types of devices are assembled within rigid containers and the rotating disks are in fixed positions. The scraper assemblies are also in fixed rigid positions. This may make servicing of the apparatus difficult, particularly since the parts to be serviced have been covered in grease and oil. In addition, the units may have been permanently installed in a plumbing system so field service is often required. Because of the nature of installation, the field service can be difficult. Also, because many of the parts are coated with F.O.G., servicing can be messy and time consuming Purchase of these systems tends to be expensive and represents a significant capital investment.

As an alternative, devices without scraper assemblies have been developed so that separation of F.O.G. and water occurs within a tank sufficient to also suffice as a storage container. These devices avoid many of the difficulties associated with the skimmer system; however, they are still expensive, difficult and messy, particularly when the storage container is full and must be emptied. These units are often too large in size to fit inside kitchen facilities so a space to accommodate the assembly size must be available for the larger separator to work. Many of these types of systems may still utilize more costly pumping apparatus for F.O.G. separation or sensing systems for accurately becoming aware of when the storage container is full. Knowing when to empty the storage container is a problem since it is often unclear how much water versus how much F.O.G. is being retained within the storage container.

Applicant addressed some of these concerns with its more economical waste removal system, described in U.S. Pat. No. 8,273,255 to Batten, herein incorporated by reference in its entirety. However, the F.O.G. transfer mechanism in Batten remains subject to clogging and messiness.

The process of emptying a removable storage container is known to be very messy. If the tank and storage container are attached so that leakage does not occur when the F.O.G. is passed to a storage container, then removing the storage container for disposal is often complicated and dirty. This is undesirable as it limits who can empty the storage container. Often, emptying the storage container occurs in a facility, such as a restaurant, held to certain cleanliness standards. Size, cost, ease of use and mess are all factors that may limit consumers access to and usage of F.O.G. separation assemblies.

Accordingly, there is a need in the art for an improved method and system for separation of F.O.G. from wastewater that is simple, space saving in design, low in cost and that minimizes the mess/difficulty associated with the storage container. In addition, there is a need in the art for a low cost apparatus that does not require significant capital outlay.

SUMMARY OF THE INVENTION

The present invention fulfills one or more of these needs in the art by providing an improved economical F.O.G. removal assembly which is low in cost, conservative in size, easy to install, easy to maintain, and minimizes the mess associated with discarding accumulated and stored F.O.G.

Accordingly, one aspect of the present invention is to provide a F.O.G. removal assembly including a container having a bottom, a top, at least one sidewall, and an inlet to receive an influent flow of F.O.G. and water from a sink drain. The container also includes an outlet for discharging grey water from the container that is spaced above the bottom and below the top. The container may include at least one baffle extending within the container at a level below the static water level to allow water to flow below the baffle from the inlet to the outlet but retaining F.O.G floating on the water. The container includes a valve at an elevation such that F.O.G. floating on water in the container can flow from the container out through the valve when an effluent level in the container is raised above the valve level. The assembly may also include an inlet baffle, an outlet baffle and a storage tank. The inlet baffle directs the influent from the sink drain into the inlet, and an outlet baffle directs the grey water out of the container and defines a static water level in the container. A storage tank is arranged to accept F.O.G. that flows out of the container through the valve when the liquid level in the container is raised above the valve level and the valve is opened. The storage tank includes a portal that interfaces with the valve.

The present invention may also be considered a method of removing F.O.G. from effluent including connecting a kitchen drain to an inlet of a container, connecting a sewage drain to an outlet in the container, the outlet being at a height such that a static water level for liquid in the container is defined, interfacing a portal on a storage tank with a valve on the container, discharging effluent water containing F.O.G. from the kitchen drain into the inlet, holding the effluent water containing F.O.G inside the container for a period to allow F.O.G. to float to the top of the contained effluent water, permitting grey water to flow from the container outlet to the sewage drain, discharging floating F.O.G. through the valve in the container and into the storage tank, monitoring a sight glass on the container to determine when the F.O.G. level within the container is sufficient to warrant emptying, separating the interface between the valve and the portal by replaceably removing the storage tank, emptying the F.O.G. stored in the storage tank, and reestablishing the interface between the valve and the portal.

These and other aspects of the present invention will become apparent to those skilled in the art after a reading of the following description of the preferred embodiment when considered with the drawings.

DESCRIPTION OF THE EXEMPLARY EMBODIMENTS

Figure 1:
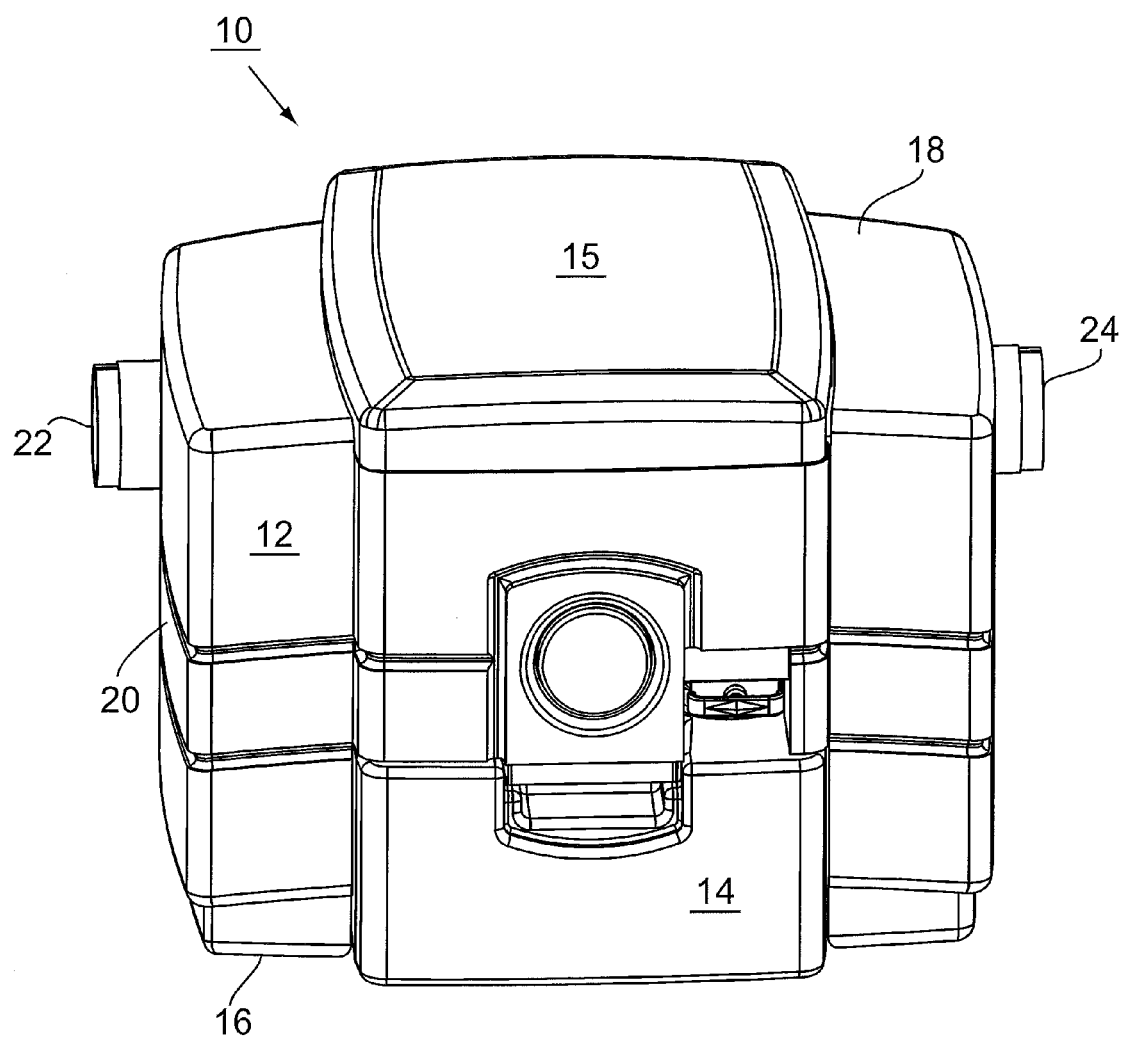
FIG. 1 is a front perspective view of an embodiment of the invention.
Figure 2:
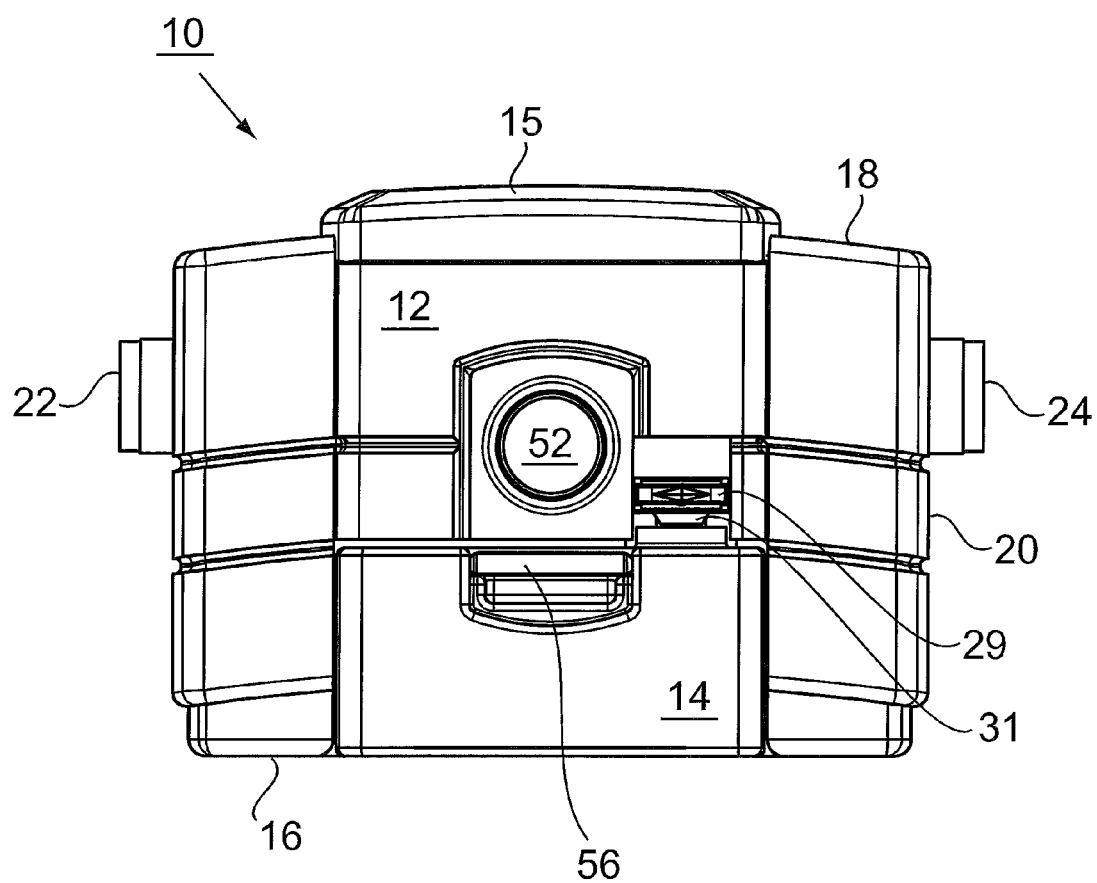
FIG. 2 is a front view of an embodiment of the invention.
Figure 3:
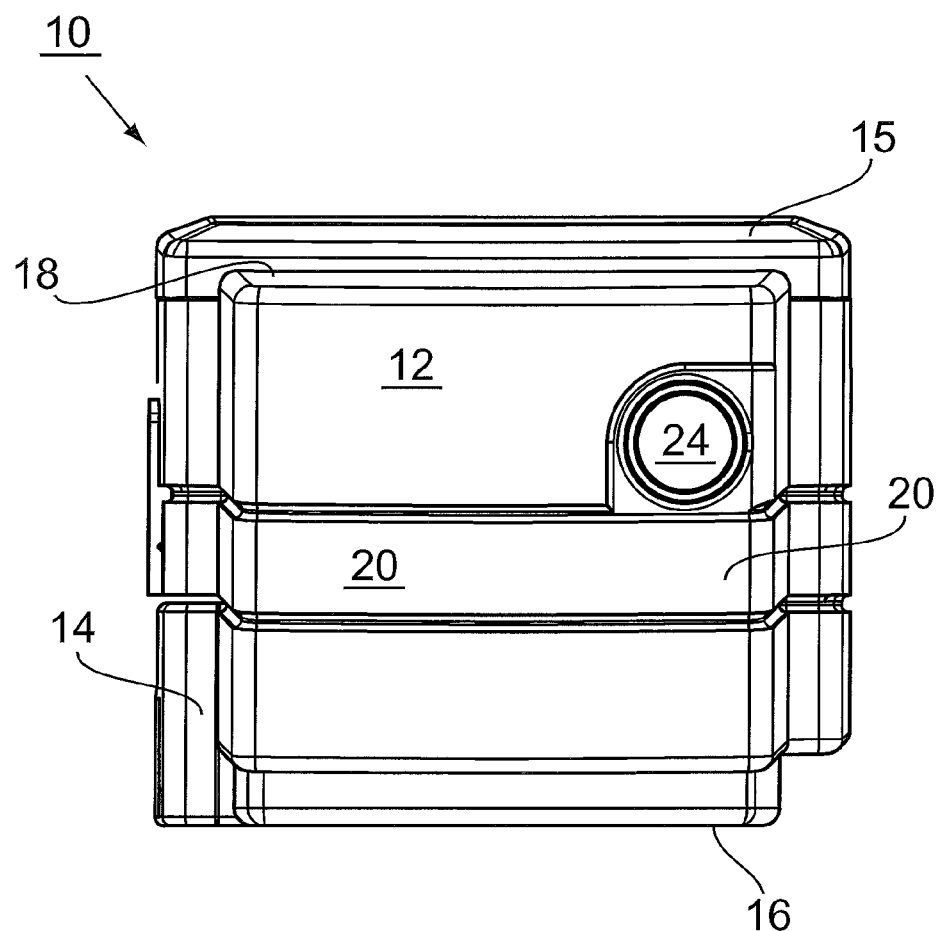
FIG. 3 is a side view of an embodiment of the invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

It will be understood that the illustrations are for the purpose of describing a preferred embodiment of the invention and are not intended to limit the invention thereto.

FIGS. 1-4, generally, show an improved economical fat, oil and grease (F.O.G.) waste removal assembly, generally designated 10, constructed according to the present disclosure. The assembly 10 separates F.O.G. from effluent and is sized to fit inside kitchen or other facilities and provides storage for the separated F.O.G., however, it does not need a scraper apparatus or electronic sensors in order to function properly. The design makes the F.O.G. removal assembly extremely economical and size conscious and, in addition, simplifies the F.O.G. transfer and storage, reducing the mess usually associated with F.O.G. separation and storage units.

Figure 4:
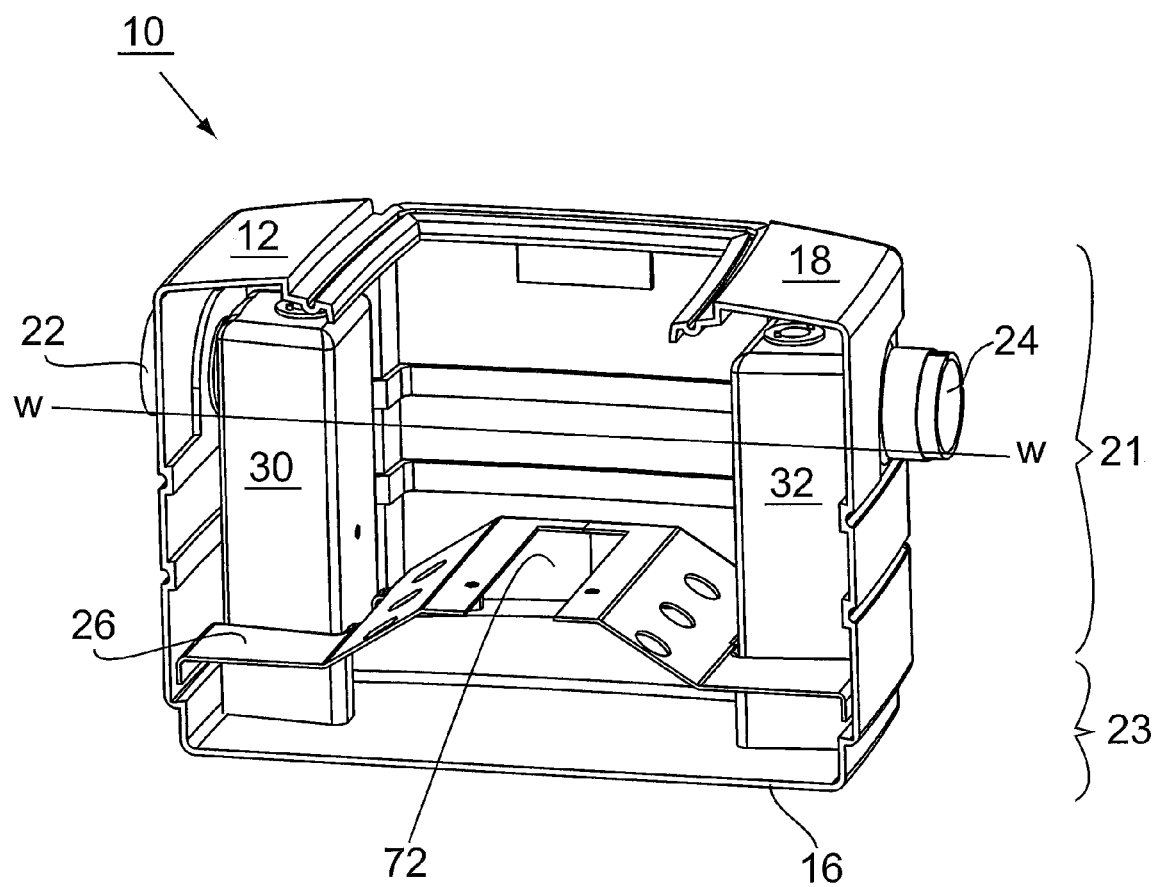
FIG. 4 is cut away view of an embodiment of a container.

One embodiment of assembly 10 includes a container 12 and a storage tank 14. Container 12 and tank 14 are preferably constructed of rotomolded plastic, although they may be constructed of other suitable material or methods as well. The container 12 includes a bottom 16, a top 18, at least one sidewall 20, and an inlet 22 to receive an influent flow of F.O.G. and water from a sink drain. The container also includes an outlet 24, for discharging grey water from the container 12. Preferably, a sight glass 52 is positioned on the front wall of container 12, above a valve handle 29, discussed below. Container 12 may also include a removable lid 15. FIG. 4 is a cut-away view of one embodiment of the container 12, with the lid 15 removed.

Figure 6A:
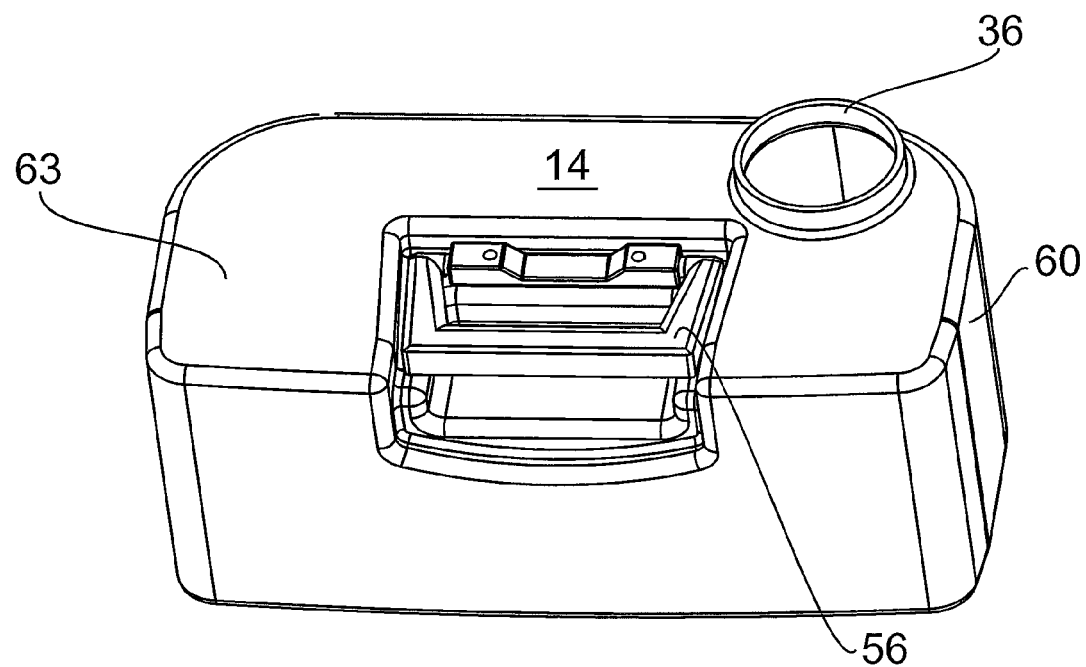
FIG. 6a is a top perspective view of an embodiment of the storage tank.
Figure 6B:
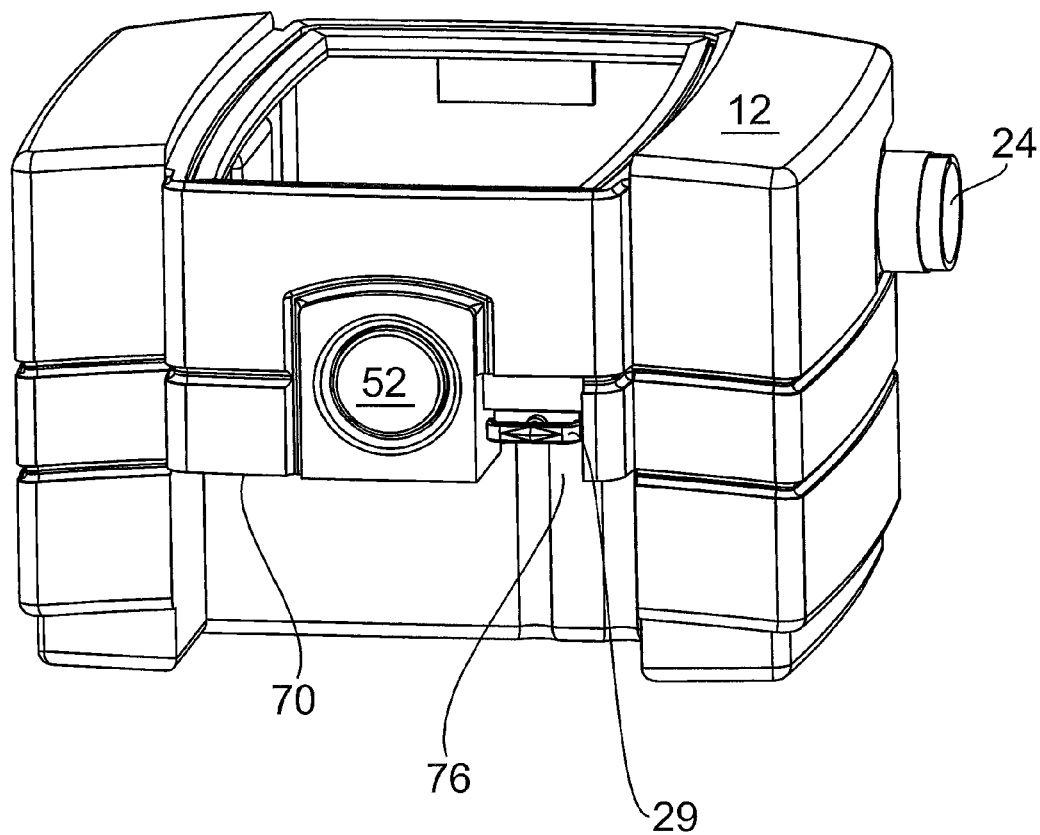
FIG. 6b is a front perspective view of an embodiment of the container with the lid removed.

As seen in FIG. 6b, the front wall of container 12 has a recess, that includes an overhang 70 that the tank 14 typically fits under, with the portal 36 of tank 14 lined up under an outlet 27 normally closed by a valve 28.

FIG. 4 shows an inlet baffle 30 that directs influent from the sink drain (not shown) and the inlet 22 downward and into a bottom portion 23 of the container. An outlet baffle 32 directs the grey water from the bottom portion 23 out of the container 12 via outlet 24 and to a drain pipe (not shown) to a sewer. The outlet 24 is located above the bottom 16 and below the top 18, so that the bottom of the outlet 24 defines a static water level W for liquid in the container 12.

Figure 5A:
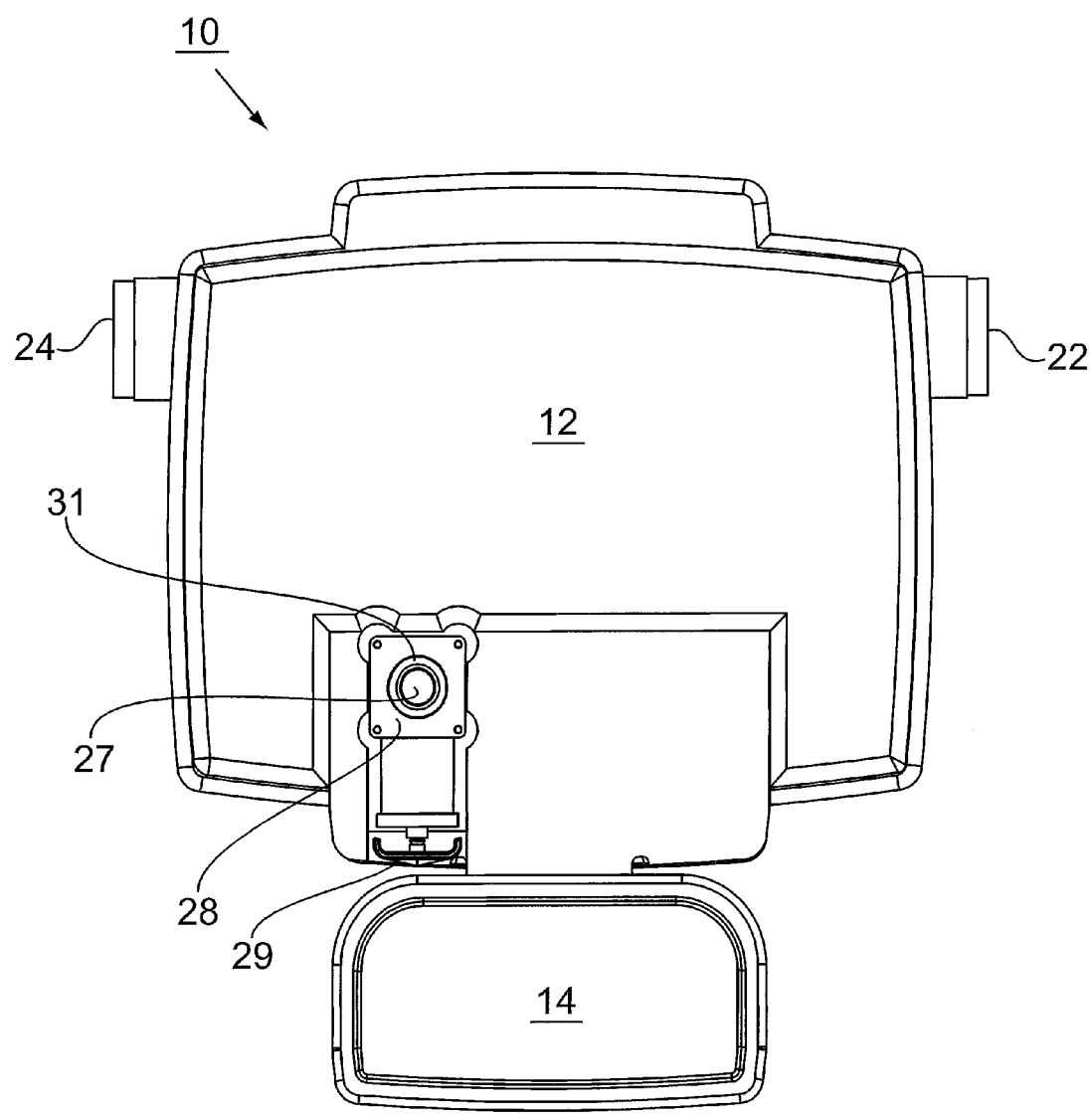
FIG. 5a is a cross-sectional bottom view of an embodiment of the container with the storage tank removed.
Figure 7:
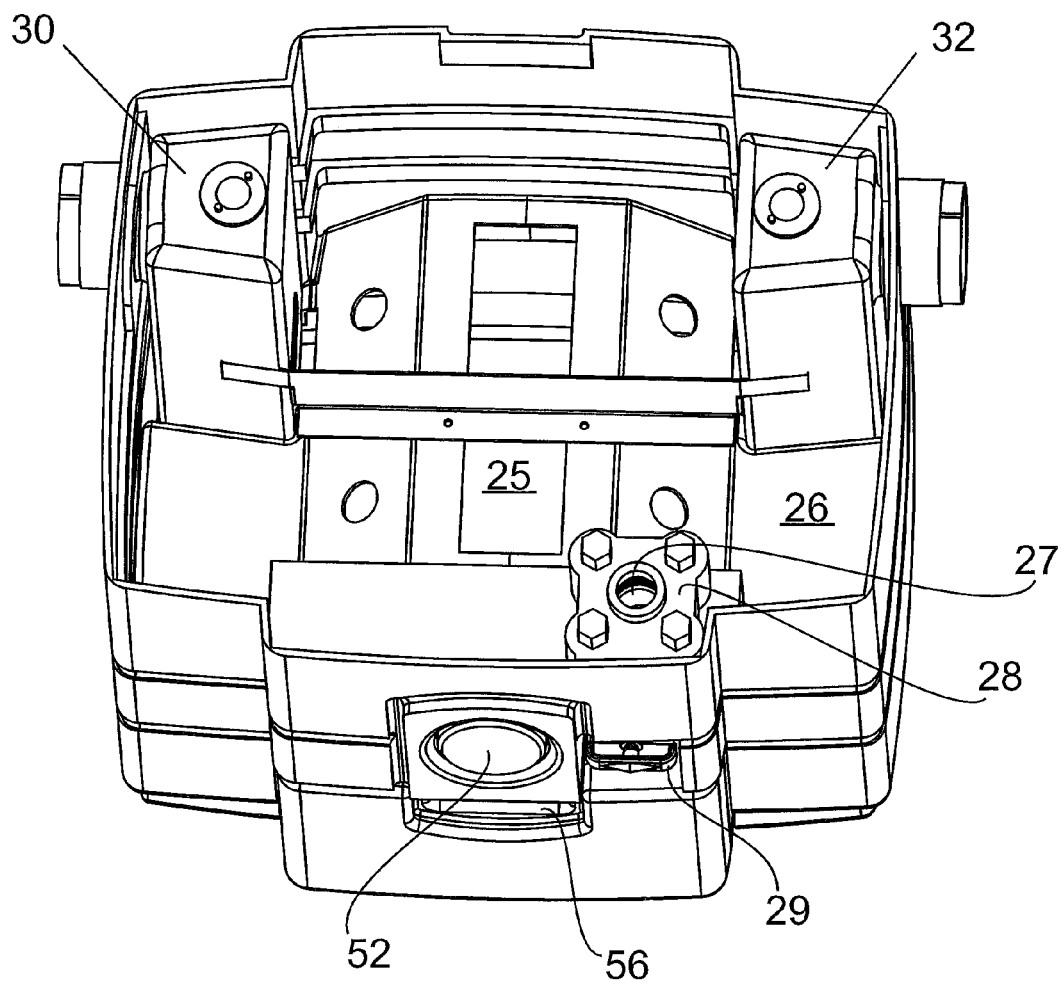
FIG. 7 is a cross sectional view of an embodiment of the invention.

The container also includes a valve 28, shown in FIG. 5a, at an elevation in the container 12 such that F.O.G. floating on water in the container 12 can flow from the container 12 out through the valve 28 when the liquid level in the container is raised above the valve inlet and the valve is opened by pulling handle 29 forward in the view of FIG. 7.

FIG. 6a shows a storage tank 14 arranged to accept F.O.G. and water that flows out of the container 12 through the valve 28 when the liquid level in the container 12 is raised above the valve inlet 27 and the valve pull 29 is engaged to open the valve. The storage tank 14 includes a raised portal 36 that interfaces with the valve 28. The valve 28, by way of example, is a linearly opening valve configured to reliably seal closed, even with a head of water above it. Valve 28 may include a funnel 31 to direct effluent neatly into tank 14 without spilling across the valve inlet 27 and onto the outer valve edges.

Container 12 has a raised height above the static water level W, which permits a significant rise and fall of fluid level within the container 12, typically caused by an input volume level greater than that allowed by the outlet baffle 32. Surging water flows (increasing the volume of fluid through a drain pipe, and thus through attached F.O.G. separation units) are not unusual. Such circumstances occur when a sink full of water is released at once when the sink's drain stopper is removed. This volume enters the container 12 through inlet 22, raising the water height above the static water level W, at least briefly. F.O.G. is lighter than water and rises to the top of the fluid in the container 12 by the force of gravity. Applicant's experience teaches that a strong effluent flow directly alongside stratified fluids can peel separated F.O.G back into the waste water. In this embodiment, the divider 26 shields the raised F.O.G. from that strong effluent flow.

The F.O.G. waste removal assembly 10 is typically connected to a kitchen sink (not shown). However, other sources of effluent providing intermittent flows may be connected to assembly 10. The fluid separation process of the invention is applicable to input sources of F.O.G. and water that provide intermittent flows. Together, these sources are referred to herein as "sinks."

Typically, inlet baffle 30 and inlet 22 receive an influent flow of F.O.G. and water from a sink drain. Outlet 24 and outlet baffle 32 discharge grey water from the container 10. The bottom of outlet baffle 32 is spaced above the bottom 16. Any heavy solids may be allowed to sink to the bottom of container 12, where they may be flushed down stream through outlet 24 if the effluent flow is great enough. Container 12 may also include a clean out port or lid through which solid waste materials may be removed when the solids settle on the bottom 16, or to otherwise access the interior in case servicing or cleaning is needed.

One or more dividers 26 may extend across the container 12, extending partially or fully from inlet baffle 30 to outlet baffle 32 at a level below the static water level to allow solids and water to flow below the divider 26 from the inlet 22 to the outlet 24. Divider 26 typically is located toward the lower portion 23 of the container 12 so that incoming fluids pass below the divider 26. As fluids enter the container 12 from inlet baffle 30, the fluids will usually have residence time within the container 12 long enough for the lighter F.O.G. to rise and separate from the remaining waste fluids. The F.O.G. stratifies to form a top layer on the waste fluids and pass through opening 72 in divider 26 toward the top of the container 12. The divider 26 may have a slope upward toward an opening 72 so that the F.O.G. floats upward toward and through opening 72 so the divider 26 shields the F.O.G. from the grey water flow along the bottom 23. The F.O.G. layer typically will accumulate above divider 26 and remain substantially undisturbed and retained within the upper container portion 21.

Valve 28 is placed at an elevation within the container 12, typically above but close to the divider height, such that F.O.G. floating on the water in container 12 can flow from container 12 out through valve 28 when the F.O.G. level in the container is raised.

As shown in FIG. 7, inlet baffle 30 and outlet baffle 32 may be interchangeable and are typically constructed the same, as mirror images of each other. Therefore, the inlet 22 may serve as the outlet 24 and vice versa so that the apparatus 10 may be oriented according to the accommodations of the area surrounding the waste water piping and to accommodate a variety of kitchen drain and sewage line angle configurations.

Effluent flow from a sink drain enters inlet baffle 30 and flows out of the lower portion of the baffle. Effluent flows as it exits the inlet baffle 30 below the stratification taking place in the upper container 21, so that any stratified F.O.G. is minimally disturbed by any strong currents in the incoming effluent flow. The flow travels into the body of the container, where substantial separation of F.O.G. and grey water occurs. A portion of the grey water continues below the divider 26 while F.O.G. floats to the top and is gathered into upper container 21. The grey water flows under and out of outlet baffle 32 and exits container 12 into the sewage drain via the outlet baffle 32, and may carry solids with it.

Storage tank 14 of assembly 10 is best seen in FIG. 6a. Storage tank 14 is preferably constructed of roto-molded plastic; however, other materials and methods can be used such as injection molding, metal stamping or other techniques. In one embodiment, strengthening ribs 60 may be provided for adding strength and stability to the walls of the storage tank 14. This may be helpful in the rotomolded embodiment. Storage tank 14 includes a portal 36 for interfacing with valve 28. Typically, portal 36 is positioned below valve 28. Wheels may be added on the bottom of the tank 14 if desired to aid in its transport when full.

F.O.G. floating on the water, and some portion of water, in some examples, may become visible in sight glass 52. The F.O.G. layer builds on top of the waste water, and as the F.O.G. builds, the boundary layer between F.O.G. and water creeps downward and may become visible in sight glass 52. The user determines when to reduce the F.O.G. layer, typically when the F.O.G layer is visible in most of sight glass 52. The user activates or retracts the valve pull 29, opening the valve between the container 12 and storage tank 14. The height of the valve 28 allows the F.O.G. to flow out through open valve 28 and into storage tank 14. The interaction between portal 36 and guide funnel 31 prevents leakage of F.O.G. or water as they pass from the container 12 to storage tank 14 by forming a substantially water-tight barrier. The storage tank 14 is of sufficient size, relative to the container 12 size, so that the amount of F.O.G. and/or fluid able to reside in the container 12 above the valve level (at static effluent level W) does not exceed the volume of the tank 14, and thus the amount able to flow into the tank 14 when valve 28 is opened. Emptying F.O.G. into storage tank 14 usually will occur when the level of fluid and F.O.G. in the container is at a static water level W. When the desired amount of F.O.G. has emptied from the container 12 into the tank 14, the user closes the valve, for example, by replacing the valve pull 29 to its original position.

When storage tank 14 is to be emptied of F.O.G., the tank is removed by pulling forward on handle 56 and releasing the tank 14 from the container.

A F.O.G. level sight glass may be included in storage tank 14, as well as container 12, allowing easy visualization of the F.O.G./water content. Sight glasses may prevent unnecessary and premature emptying of container 12 and/or storage tank 14 and easy viewing of the F.O.G. and water levels within the storage tank 14 by inspectors or operators.

While the prior art has supplied F.O.G. storage containers that may be emptied and reused, there remains a need for such a removable storage container that minimizes clogging, the difficulty and mess that has come to be associated with such containers. The valve interface for emptying the container F.O.G. content into the storage tank addresses the need of simplifying the F.O.G. storage and transfer process. While Applicant's invention minimizes the mess when fluids are transferred to and from the storage tank 14, the design of the tank also accomplishes easy and mess free emptying. When emptying is required, a pull handle 56 may be used for separating the tank 14 from the container, which pulls the tank 14 free of the container 12.

Handle 56 (see FIG. 6a) may be used for transporting storage tank 14 to empty the accumulated F.O.G. Carry handle 56 may be located on the top 63 of storage tank 14 and toward the same side as the portal 36. This places the center of gravity of storage tank 14 so that the weight distribution of the loaded tank 14 pivots the portal 36 upwards when tank 14 is lifted by handle 50. With portal 36 skewed upward, F.O.G. is not inclined to spill or leak out of the storage tank 14. Wheels may be oriented in any direction to allow storage tank 14 to roll at various angles. Portal 36 may also be used as a pour spout, allowing ease of discarding stored F.O.G. These features provide a clean and effective way to dispose of stored F.O.G. without the mess usually associated with F.O.G. tank emptying.

In one embodiment, the container 12 may be substantially enclosed in a separator wrap. The separator wrap has openings through which the inlet baffle 30 and the outlet baffle 32 connect to the sink and sewer drain. There is also a fitted hole through which the guide funnel 31 passes to allow the funnel to interface with hub 36. Storage tank 14 may remain outside of the separator wrap so that it may be easily accessed for F.O.G. disposal.

The invention may also be considered a method of removing F.O.G. from effluent. Steps involved include connecting a kitchen drain (not shown) to an inlet 22 or inlet baffle 30 of a container 12 and connecting a sewage drain (not shown) to an outlet 24 or an outlet baffle 32 in the container 12. The method also includes placing a removable storage tank 14 with a container 12, interfacing a portal 36 on a storage tank 14 with a valve 28 on the container 12. Effluent water containing F.O.G. from the kitchen drain discharges into the inlet 22. The effluent water containing F.O.G is held inside the container 12 for a period to allow F.O.G. to float to the top of the contained effluent water, and grey water flows (i.e. effluent water from which F.O.G. has been depleted) from the container outlet 24 to the sewage drain. The valve pull 56 is engaged to open the valve 28 and F.O.G. is drained into the storage tank 14. The method may include monitoring a sight glass 52 on the storage tank 14 to determine when the F.O.G. level within the tank 14 is sufficient to warrant emptying, emptying the F.O.G. stored in the storage tank 14 and reestablishing the interface between the portal 36 and the port 28.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. An economical fat, oil, and grease (F.O.G.) removal assembly for use in kitchens, comprising:
   a container having a bottom, a top, at least one sidewall, an inlet to receive a flow of effluent made up of F.O.G. and water from a drain, and an outlet for discharging grey water from the container, wherein the inlet and outlet are spaced above the bottom and below the top, at least one sidewall of the container comprising a recess, said recess further comprising an overhang that is above the bottom and that has a bottom face,
   a linearly opening valve mounted horizontally in the bottom face of the overhang of the container at a valve level, the linearly opening valve having a valve pull so the valve can be alternated between open and closed positions and an opening to make a vertical passageway so that F.O.G. floating on water in the container can flow downwardly through the overhang and the valve and out the container when an effluent level in the container is raised above the valve level and the valve is opened by pulling the valve pull,
   a removable storage tank configured to be located under the overhang of the container, the storage tank having a portal to align with the valve opening when the storage tank is located under the overhang to accept F.O.G. that flows downwardly out of the container through the valve opening when the effluent level in the container is raised above the valve level and the valve is opened.

2. The assembly according to claim 1, further including at least one divider extending across the container at a level below the outlet to allow water to flow below the divider from the inlet to the outlet but retaining F.O.G. floating on the water.

3. The assembly according to claim 1, further including an inlet baffle directing the flow of effluent from the inlet into the container and outlet baffle directing the grey water to the outlet.

4. The assembly according to claim 1, wherein the storage tank is made of rotomolded plastic.

5. The assembly according to claim 1, wherein the container includes a clean out port.

6. The assembly according to claim 2, wherein the divider elevates toward an opening so that F.O.G. is directed toward the opening as it separates from the water.

7. The assembly according to claim 3, wherein the inlet baffle and the outlet baffle are identical to one another in structure.

8. The assembly according to claim 1, wherein the storage tank includes a carry handle.

9. The assembly according to claim 1, wherein the storage tank includes a F.O.G. level sight glass.

10. The assembly according to claim 1, wherein the container includes a F.O.G. level sight glass.

11. The assembly according to claim 1, wherein the storage tank includes at least one wheel so that the storage tank may be rolled when the F.O.G. is to be disposed of from the storage tank.

12. The assembly according to claim 1, wherein the storage tank includes a pour spout for removal of F.O.G.

13. The assembly according to claim 1, wherein at least one sidewall of the container includes horizontal strengthening ribs.

14. The assembly according to claim 1, wherein the storage tank includes vertical strengthening ribs.

15. The assembly according to claim 8, wherein the storage tank has a front, a top, and a center of gravity, and the portal is located in the top adjacent the front of the storage tank and the carry handle is located on the top of the storage tank, between the center of gravity and the front of the storage tank, whereby picking the storage tank up by the carry handle skews the weight of the F.O.G. stored in the storage tank away from the front of the storage tank, tilting the portal upwardly to avoid spilling the F.O.G. through the portal.

* * * * *